(12) United States Patent
Yang et al.

(10) Patent No.: US 7,149,060 B2
(45) Date of Patent: Dec. 12, 2006

(54) ACTUATION DEVICE AND METHOD FOR HIGH DENSITY HARD DISK DRIVE HEAD

(75) Inventors: Xiao Yang, Fremont, CA (US); Visit Thaveeprungsriporn, Bangkok (TH); Szu-Han Hu, Bangkok (TH)

(73) Assignee: Magnecomp Corporation, Temecula, CA (US)

( * ) Notice: Subject to any disclaimer, the term of this patent is extended or adjusted under 35 U.S.C. 154(b) by 296 days.

(21) Appl. No.: 10/440,452

(22) Filed: May 15, 2003

(65) Prior Publication Data

US 2004/0066571 A1   Apr. 8, 2004

Related U.S. Application Data

(60) Provisional application No. 60/415,384, filed on Oct. 1, 2002.

(51) Int. Cl.
*G11B 5/596* (2006.01)
(52) U.S. Cl. .................................................. 360/294.3
(58) Field of Classification Search ...................... None
See application file for complete search history.

(56) References Cited

U.S. PATENT DOCUMENTS

| | | | |
|---|---|---|---|
| 6,262,868 B1 * | 7/2001 | Arya et al. | 360/290 |
| 6,731,471 B1 * | 5/2004 | Bonin | 360/294.3 |
| 6,757,140 B1 * | 6/2004 | Hawwa | 360/294.5 |
| 6,853,517 B1 * | 2/2005 | Hirano et al. | 360/294.3 |
| 2003/0133228 A1 * | 7/2003 | Chen et al. | 360/244.3 |

* cited by examiner

*Primary Examiner*—Robert S. Tupper
(74) *Attorney, Agent, or Firm*—Townsend and Townsend and Crew LLP

(57) ABSTRACT

A disk drive apparatus. The apparatus has a first drive device and a support member coupled to the first drive device. The support member has a tongue portion and a gimbal portion. The tongue portion is coupled the gimbal portion. A fixed drive device is formed within a first portion of the tongue portion. A movable drive device is operably coupled to the fixed drive device and formed within a second portion of the tongue portion. A read/write head is coupled to the movable drive device. A voltage source is coupled between the fixed drive device and the movable drive device to cause movement of the read/write head by forming an interaction between the fixed drive device and the movable drive device.

9 Claims, 11 Drawing Sheets

ACTUATION DEVICE AND METHOD FOR HIGH DENSITY HARD DISK DRIVE HEAD

BACKGROUND OF THE INVENTION

This invention generally relates to techniques for operating a disk drive apparatus. More particularly, the present invention provides a method and apparatus for reading and writing information onto a computer disk commonly called a hard disk for storing data. Merely by way of example, the present invention is implemented using such method and apparatus with an actuating device coupled between a read/write head and support member for fine tuning the read/write head onto a data track on the hard disk, but it would be recognized that the invention has a much broader range of applicability.

Storage of information has progressed through the years. From the early days, primitive man stored information on walls of caves, as well as used writings on wood such as bamboo. Since then, people have used wood, silk, and papers as a media for writings. Paper has been bound to form books. Information is now stored electronically on disks, tape, and semiconductor devices. As merely an example, some of the early disks used magnetic technology to store bits of information in a digital manner onto the magnetic media. One of the first disk drives was discovered in the 1950's by International Business Machines of Armonk, N.Y.

Although such disks have been successful, there continues to be a demand for larger storage capacity drives. Higher storage capacity can be achieved in part by increasing an aerial density of the disk. That is, the density increases with the number of tracks per inch (TPI) and the number of bits per inch (BPI) on the disk.

As track density increases, however, the data track becomes narrower and the spacing between data tracks on the disk decreases. It becomes increasingly difficult for the motor and servo control system to quickly and accurately position the read/write head over the desired track. Conventional actuator motors, such as voice coil motors (VCM), often lack sufficient resolution and bandwidth to effectively accommodate high track-density disks. As a result, a high bandwidth and resolution often necessary to precisely position the read/write head over a selected track of the disc.

Additionally, microactuators should also be cost effectively manufactured. Most microactuator devices are often fabricated in individual form, which is discrete and separate from others. Unfortunately, microactuators are often fragile, small in size, and difficult to handle effectively. Accordingly, complex assembly procedures are generally required to attach individual microactuator device elements to a suspension assembly. Such procedures are often inefficient and increases manufacturing cost, reduces yield, and causes longer throughput times.

Thus, there is a need for an improved high volume manufacturing process for microactuator devices.

SUMMARY OF THE INVENTION

According to the present invention, techniques for operating a disk drive apparatus are provided. More particularly, the present invention provides a method and apparatus for reading and writing information onto a computer disk commonly called a hard disk for memory applications. Merely by way of example, the present invention is implemented using such method and apparatus using with an actuating device coupled between a read/write head and support member for fine tuning the read/write head onto a data track on the hard disk, but it would be recognized that the invention has a much broader range of applicability.

In a specific embodiment, the invention provides an improved disk drive apparatus. The apparatus has a first drive device (e.g., voice coil motor, commonly called VCM) and a support member (e.g., suspension) coupled to the first drive device. Preferably, the support member is operably coupled via pivoting action to the voice coil motor. The support member has a tongue portion and a gimbal portion, which are formed on a larger gimbal structure. The tongue portion is coupled the gimbal portion. That is, the larger gimbal structure is a continuous elongated member, which includes a tongue portion that extends within the gimbal structure. The tongue portion is continuous with a certain portion of the gimbal structure. Preferably, the tongue portion, which is shaped like a "tongue," has at least three sides, which are free from attachment to the gimbal structure, which allows for the tongue portion to move and/or flex (e.g., pitch, roll, rotate, yaw) in three-dimensions, e.g., three degrees of freedom, or in four dimensions, e.g., three rotational and 1 translational. Alternatively, the tongue may be supported by other configurations, which do not include three sides. Further details of the tongue portion can be found throughout the present specification and more particularly below. A fixed drive device is formed within a first portion of the tongue portion. Preferably, the fixed drive device is machined (e.g., etch, stamp) into the first portion of the tongue portion. A movable drive device is operably coupled to the fixed drive device and formed within a second portion of the tongue portion. Preferably, the fixed drive device and movable drive device operate in a manner to allow the movable drive device to rotate about an axis normal to a surface area of the tongue portion and preferably a surface of the fixed portion of the fixed drive device. In a specific embodiment, the fixed drive device and the movable drive device operably couple to each other via a comb structure configuration, which allows the movable drive device to move relative to the fixed drive device. A read/write head is coupled (e.g., attached, bonded, glued) to the movable drive device. Preferably, the coupling is permanent and does not allow the read/write head to move relative to the movable drive device. That is, the read/write head and movable drive device operate together. A voltage source is coupled between the fixed drive device and the movable drive device to cause movement of the read/write head by forming an interaction between the fixed drive device and the movable drive device. Preferably, the voltage source causes an electrostatic force to actuate the movable drive device via electrostatic attractive forces.

In an alternative specific embodiment, the invention provides a method for operating a disk drive apparatus. The method includes applying a read/write head onto a movable disk, which is rotated about a fixed axis. The read/write head is disposed on a movable drive device, which is operably coupled to a fixed drive device. The movable drive device is formed on a tongue portion of a substrate. The method adjusts a voltage source coupled between the fixed drive device and the movable drive device to cause movement of the read/write head by forming an interaction between the fixed drive device and the movable drive device.

Still further, the invention provides a method for fabricating an integrated actuating device for a read/write head. The method includes providing a substrate, which has an upper surface. A plurality of trench isolation regions are formed within the substrate to define a plurality of external drive regions. The method also forms a plurality of movable drive members and a plurality of fixed drive members on the substrate. The movable drive members are operably coupled to the fixed drive members. The movable drive members are formed around a center region, which is an axis of the movable drive members. The method also attaches a read/write head on the center portion of the plurality of movable drive members.

Numerous benefits are achieved using the invention over conventional techniques. In a specific embodiment, the present invention can be implemented using conventional lithographic technologies. Additionally, the invention can allow for the read/write head to move in a rotational manner through a linear relationship between the drive voltage and movement of the read/write head. The invention provides a simple but elegant design, which are relatively easy to manufacture. Here, the drive device is integrated into the tongue portion of the gimbal structure, where the drive device is actually formed via patterning of the gimbal structure, which uses fewer assembly steps than conventional techniques. The drive device has the same form factor as the tongue portion, which allows for a smaller overall form factor for the read/write head and gimbal assembly in certain embodiments. Depending upon the embodiment, one or more of these benefits may be achieved. These and other benefits are described throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, techniques for operating a disk drive apparatus are provided. More particularly, the present invention provides a method and apparatus for reading and writing information onto a computer disk commonly called a hard disk for memory applications. Merely by way of example, the present invention is implemented using such method and apparatus using with an actuating device coupled between a read/write head and support member for fine tuning the read/write head onto a data track on the hard disk, but it would be recognized that the invention has a much broader range of applicability.

Figure 1:
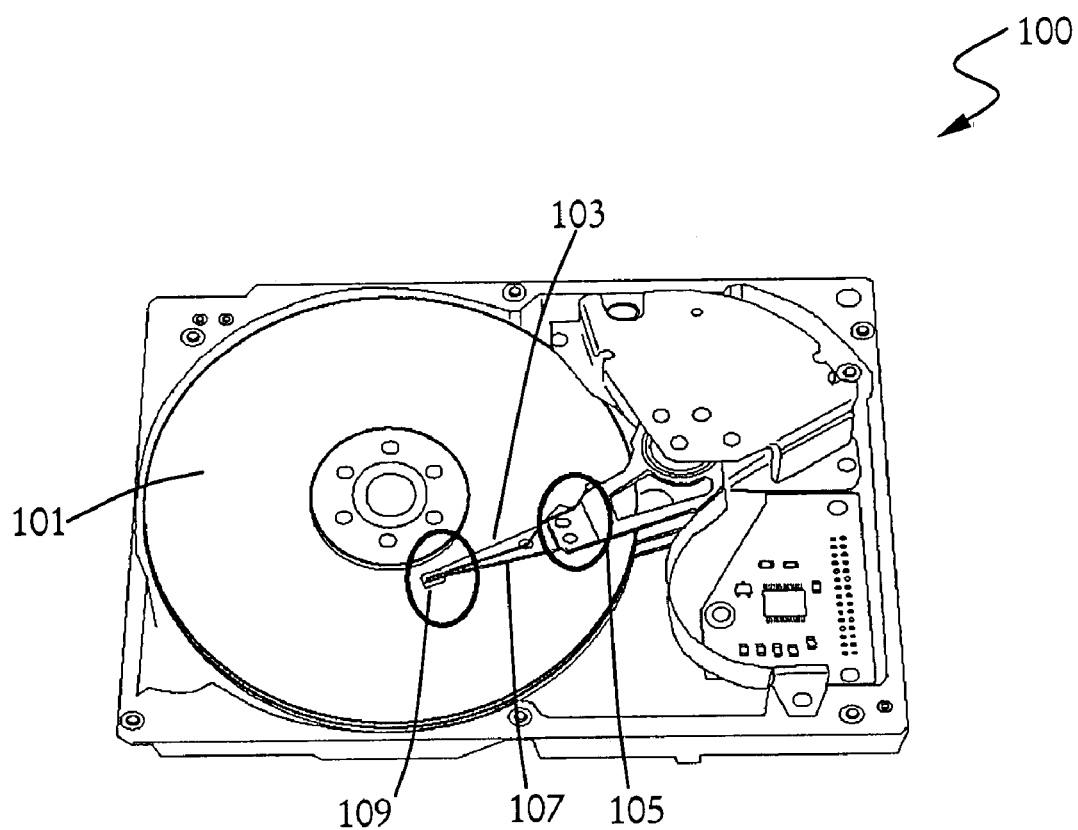
FIG. 1 is a simplified top-view diagram of a disk drive apparatus according to an embodiment of the present invention.

FIG. 1 is a simplified top-view diagram 100 of a disk drive apparatus according to an embodiment of the present invention. This diagram is merely an example, which should not unduly limit the scope of the claims herein. One of ordinary skill in the art would recognize many other variations, modifications, and alternatives. As shown, the apparatus 100 includes various features such as disk 101, which rotates about a fixed axis. The disk also includes tracks, which are used to store information thereon. The disk rotates at 7,200 RPM to greater than about 10,000 depending upon the embodiment. The disk, commonly called a platter, often includes a magnetic media such as a ferromagnetic material, but can also include optical materials, common coated on surfaces of the disk, which become active regions for storing digital bit information. Overlying the disk is head gimbal assembly or HGA 103, which operates and controls a slider 109 coupled to a read/write head. The head gimbal assembly is coupled to suspension 107 which couples to an arm 105. The arm is coupled to a voice coil motor or VCM, which moves the head assembly about a pivot point in an annular manner. The VCM can move at a frequency of up to about 1 kHz. Preferably, for high track density, e.g. 250 k TPI, the speed is at least 5 kHz, but can also be greater in certain embodiments.

Figure 2:
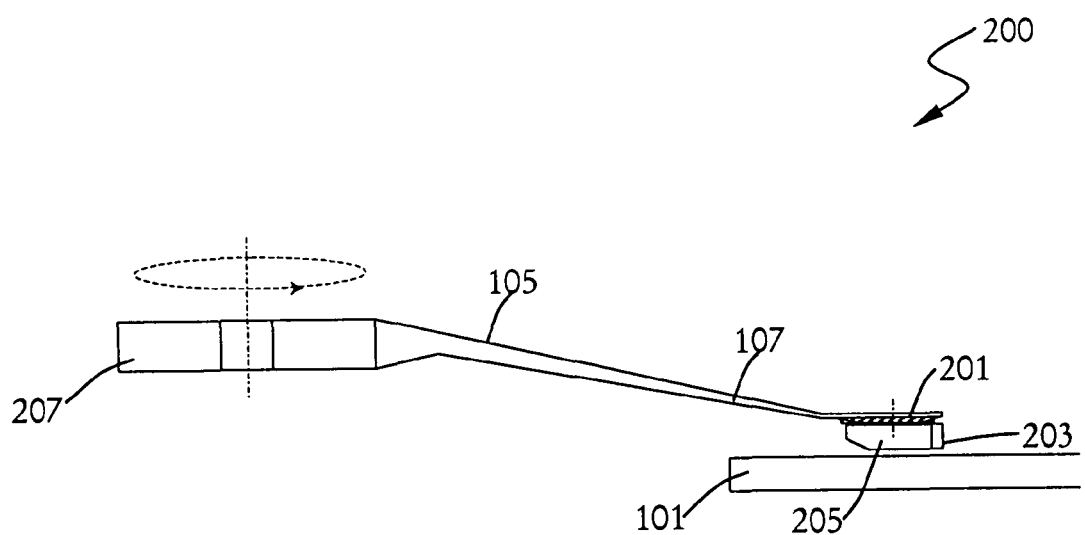
FIG. 2 is a more detailed side-view diagram of a disk drive suspension assembly according to an embodiment of the present invention.

FIG. 2 is a more detailed side-view diagram of a disk drive arm assembly 200 according to an embodiment of the present invention. This diagram is merely an example, which should not unduly limit the scope of the claims herein. One of ordinary skill in the art would recognize many other variations, modifications, and alternatives. Like reference numerals are used in this diagram as certain other diagrams herein, which should not be limiting. As shown, the assembly includes suspension 107 coupled to arm 105 coupled to voice coil motor 207. The voice coil motor allows the arm to move in a rotational manner about a region of the disk drive platter. The voice motor coil often actuates at a frequency of less than 1 kHz, but can be slightly more depending upon the application. Slider 205 is coupled to another end of the suspension, which is often the free end of the suspension. The slider includes read/write head 203. The head is positioned over a track on the platter 101, which is among a plurality of tracks on the disk. Each of the tracks is spaced from each other at a dimension of less than one half of a micron in preferred embodiments.

Preferably, the head gimbal assembly also includes a microactuator device 201 integrated on the trace gimbal 203 and coupled to the slider 204. Here, the microactuator device moves the head in a manner normal to the track. Preferably, the microactuator device allows for movement of up to 1 micron, but is accurate to about a few nanometers in preferred embodiments. The microactuator can move using a frequency of 4 kHz, but can also be greater, depending upon the application. In this embodiment, the microactuator is 'collocated' with respect to the head element 203 that is attached to the slider.

Preferably, the actuating device is comb drive fabricated on the tongue portion of the gimbal, preferably the substrate material is stainless steel. The comb drive actuating device is operable by electrostatic force. The actuator device allows the read/write head to move in very small and accurate steps, e.g., less than 1 micron, but can also be slightly greater in certain applications. Additionally, the fixed comb device has a thickness that is the same as the thickness of the tongue portion, which provides a smaller form factor than conventional techniques. Further details of a present method for fabricating the drive device are provided throughout the present specification and more particularly below.

Figure 3:
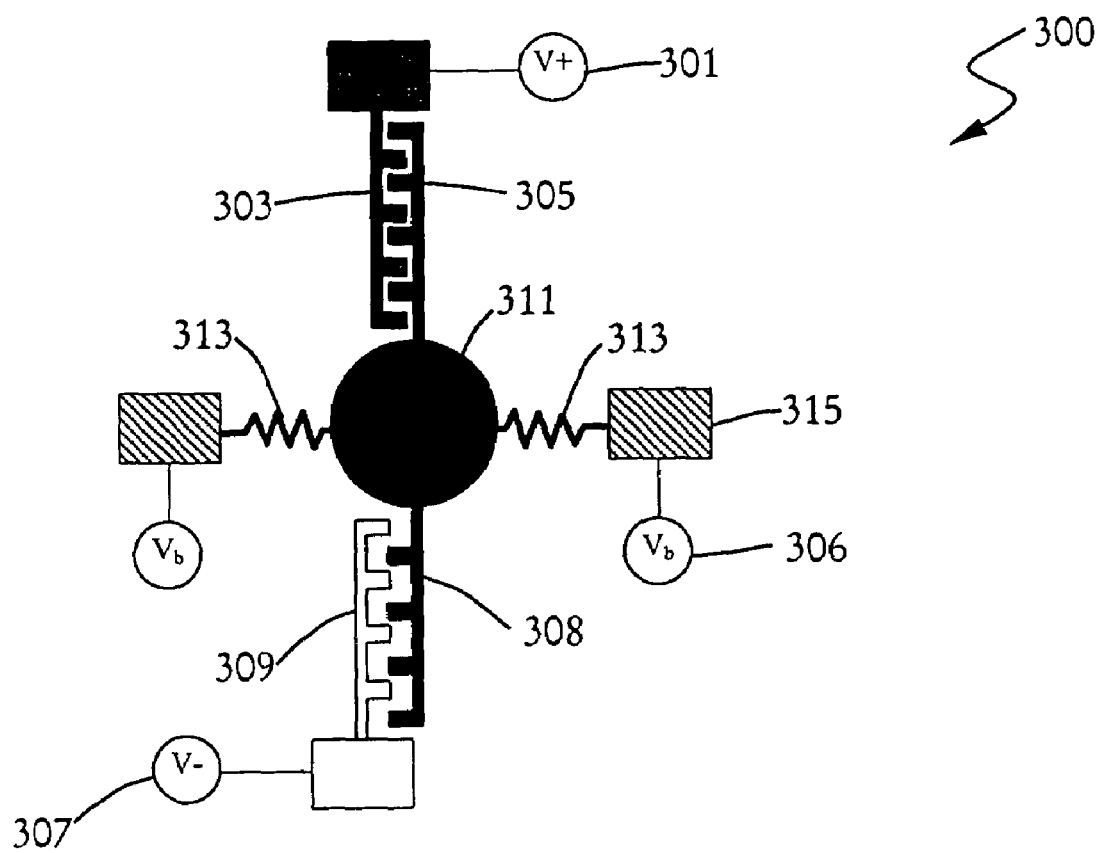
FIG. 3 is a detailed diagram of the operating principle of an electrostatic actuated comb drive according to an embodiment of the present invention.

FIG. 3 is a detailed diagram of the operating principle of an electrostatic actuated comb drive 300 according to an embodiment of the present invention. This diagram is merely an example, which should not unduly limit the scope of the claims herein. One of ordinary skill in the art would recognize many other variations, modifications, and alternatives. Like reference numerals are used in this figure as others, but are not intended to be limiting. As shown, when a voltage 301 is applied to a movable comb member 303 whereas a fixed comb member 305 is at a lower voltage potential 306, an electrostatic attraction force is occurred between the two comb members that pulls the movable comb member towards to the fixed comb member. Preferably, the fixed comber members 305 and 308 are tied to a bias voltage 306, a differential voltage 301 and 307 are applied to opposite movable comb members 303 and 309 respectively. The equal and opposite forces yield a torque moment that rotates the moveable member of the actuator around the rotating center 311. A symmetric pair of spring 313 couples between the rotating center and fixed ends 315. The movement of the moveable member causes a displacement of the spring which generates a mechanical torque that counterbalances the electrostatic torque, thus reaches a state of equilibrium. The displacement of the moveable member is proportional to the differential voltage applied. According to a specific embodiment, the drive voltage can range from about 10 volts to 20 volts, but can be larger or smaller depending upon the application.

Figure 4:
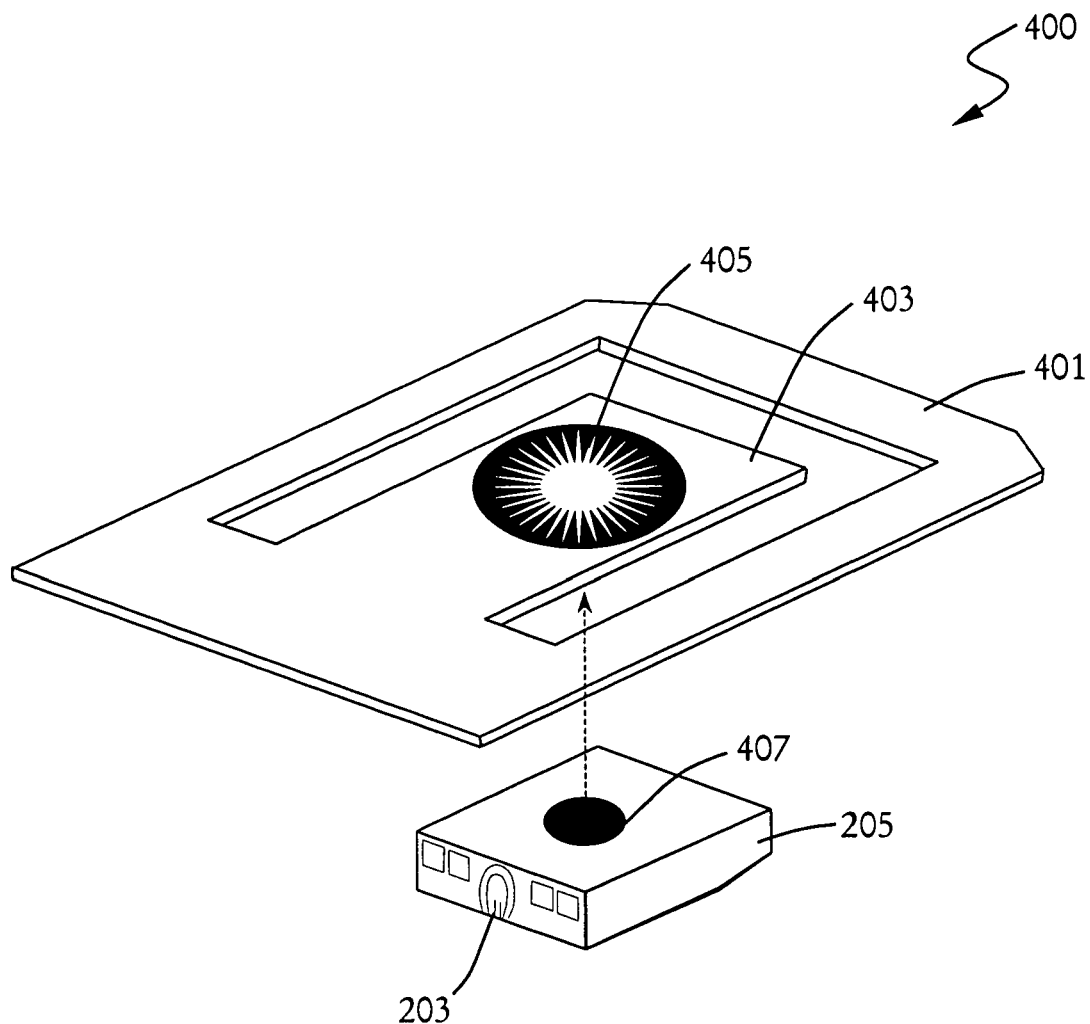
FIG. 4 is a three dimensional illustration of a diagram of a gimbal with a tongue portion whereupon a comb drive actuator is formed, and slider attachment method.

FIG. 4 is a three-dimensional illustration of a diagram of a gimbal with a tongue portion whereupon a comb drive actuator is formed, and slider attachment method 400 according to an embodiment of the present invention. This diagram is merely an example, which should not unduly limit the scope of the claims herein. One of ordinary skill in the art would recognize many other variations, modifications, and alternatives. Like reference numerals are used in this figure as others, but are not intended to be limiting. As shown, the trace gimbal 401 includes a tongue portion 403. A comb drive actuator 405 is formed on the tongue portion. The center 407 of the top face of the slider 205 is attached to the bottom face of the rotating center of the actuator. The rotating movement of the actuator causes a corresponding movement of the read/write head element 203.

The slider rotates around the center or moves linearly depending upon an embodiment of the present invention. Preferably, the slider rotates through an angle of about 0.2 degrees, but can also be more or less depending upon the application. The read/write head can move about 1 micron or less based upon the angle of movement of the slider, depending upon the application. The slider is firmly attached to the movable drive device via glue, bonding, or other permanent and suitable techniques.

Figure 5:
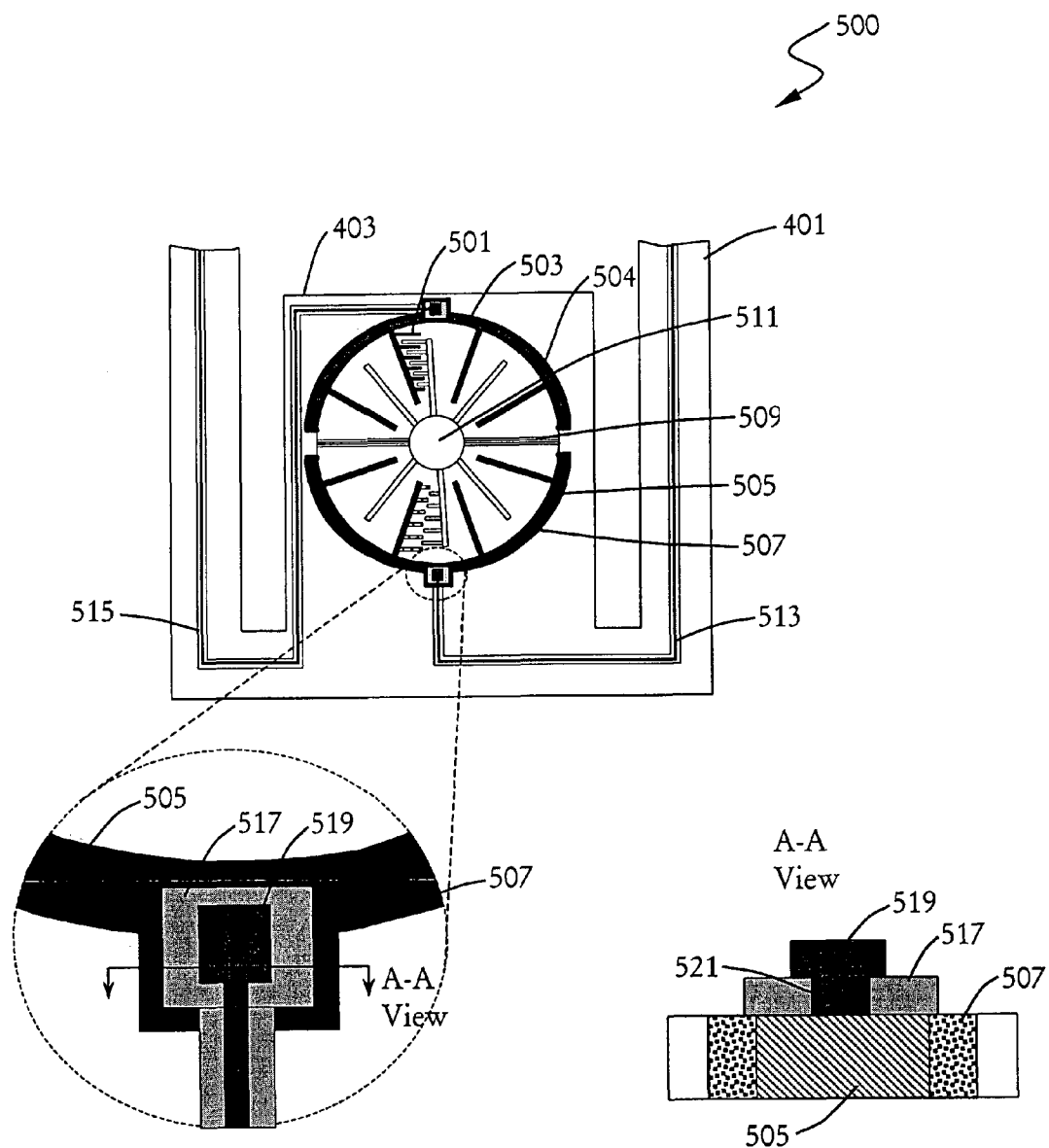
FIG. 5 is a detailed top-view diagram of an integrated comb drive actuator formed on the gimbal substrate.
Figure 6:
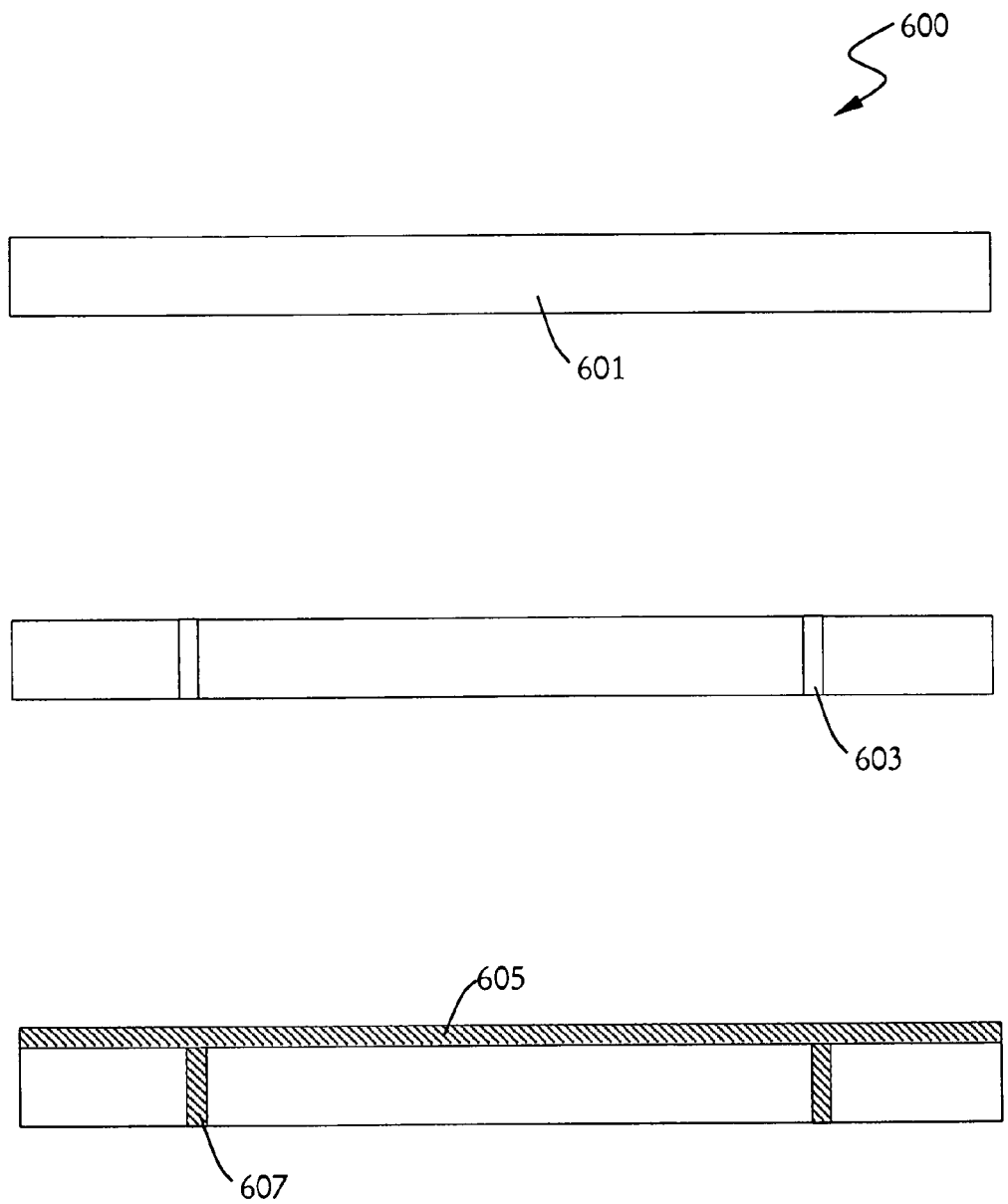
FIGS. 6 through 9 are simplified diagrams illustrating a method according to an embodiment of the present invention.

FIG. 5 is a detailed top-view diagram of an integrated comb drive actuator formed on the gimbal substrate 500 according to an embodiment of the present invention. This diagram is merely an example, which should not unduly limit the scope of the claims herein. One of ordinary skill in the art would recognize many other variations, modifications, and alternatives. Like reference numerals are used in this figure as others, but are not intended to be limiting. As shown, the gimbal 401 includes a tongue portion 403 whereupon the comb drive actuator is formed. Preferably, the gimbal substrate material is stainless steel, but can be others such as silicon, copper, etc. As shown, the tongue portion is coupled the gimbal portion. That is, the larger gimbal structure is a continuous elongated member, which includes a tongue portion that extends within the gimbal structure. The tongue portion is continuous with a certain portion of the gimbal structure. Preferably, the tongue portion, which is shaped like a "tongue," has at least three sides, which are free from attachment to the gimbal structure, which allows for the tongue portion to move and/or flex (e.g., pitch, roll, rotate) in three-dimensions, e.g., three degrees of freedom. Alternatively, the tongue can be supported by other devices such as springs, etc. A plurality of comb fingers 501 is connected to a fixed common 504 which is electrically isolated by an insulation layer 503, e.g., polyimide or other suitable material. Similarly, the other portion of the comb fingers is connected to a different fixed common 505 which is electrically isolated by a different insulation layer 507. Mechanical spring 509 couples between the center of the moveable portion of the actuator 511 and the fixed portion of the gimbal. Preferably, the mechanical spring provides a bias against the direction of the comb drives, which move the drive device. The two polarities 505 and 504 of the actuator are connected by copper traces 513 and 515 respectively whereupon a differential voltage is applied.

As shown in an enlarged view and cross-section A-A view, an insulation layer 517 isolates the copper traces from the stainless steel substrate. The contact 519 connects the copper trace to a polarity of the actuator 505 through via 521. Of course, there can be many other variations, alternatives, and modifications.

In a specific embodiment, the present invention provides a method for fabricating an integrated comb drive actuator and gimbal structure. Preferably, the method can be outlined as follows:

1. Provide a substrate, e.g., stainless steel;
2. Pattern (e.g., photolithography) the substrate to define isolation region;
3. Form a layer of polyimide to a predetermined thickness underlying a top surface of the substrate;
4. Form a conductive layer (e.g., metal, copper, platinum) overlying the polyimide layer to form an electrode layer;
5. Form photoresist layer underlying the substrate; pattern the photoresist layer to define comb drive and gimbal structure;
6. Form comb drive and gimbal structure by etching stainless steel;
7. Pattern (e.g., photolithography) polyimide;
8. Electroplate the comb finger structure to narrow the gap; and
9. Perform other steps, as desired.

Further details of the method are provided using the diagrams outlined below.

FIGS. 6 through 9 are simplified diagrams illustrating a method 600 according to an embodiment of the present invention. These diagrams are merely examples, which should not unduly limit the scope of the claims herein. One of ordinary skill in the art would recognize many other variations, modifications, and alternatives. As shown, the method includes providing a substrate 601, e.g., stainless steel. The substrate can be made of a suitable layer, which has flexibility and enough strength, including stiffness. The substrate has a relatively constant thickness and finish. As shown, the substrate has a upper surface and lower surface.

As shown, the substrate is patterned to define the isolation region 603, which corresponds to a region of reference numeral 507 in FIG. 5. Here, isolation region is a trench structure that has been provided by patterning. Preferably, the trench structure has substantially vertical sidewalls. Additionally, the trench structure extends from the upper surface to the lower surface to form openings in the substrate, although some embodiments many not require such openings. The patterning process includes photolithography and etching, which removes selected portions of the substrate as shown. Etching can be performed using suitable etchants such as HCl, and others. The method forms a layer of polyimide 605 overlying a top surface of the substrate. As shown, the polyimide also substantially fills in the etched isolation region 607 in the substrate. Alternatively, another layer of insulating material can be used depending upon the application. Preferably, the polyimide is spin coated using conventional techniques. Preferably, the polyimide forms plugs that extend from the top surface to the bottom surface in certain embodiments.

Additionally, the insulating layer is formed overlying the top surface of the substrate. As noted, the insulating layer can be polyimide. Here, the polyimide is often coated to a thickness of about 10 microns or less in a specific embodiment. As shown, the thickness is substantially continuous and has a constant thickness overlying the top surface. The polyimide is then cured and patterned, which will be described in more detail below.

Figure 7:
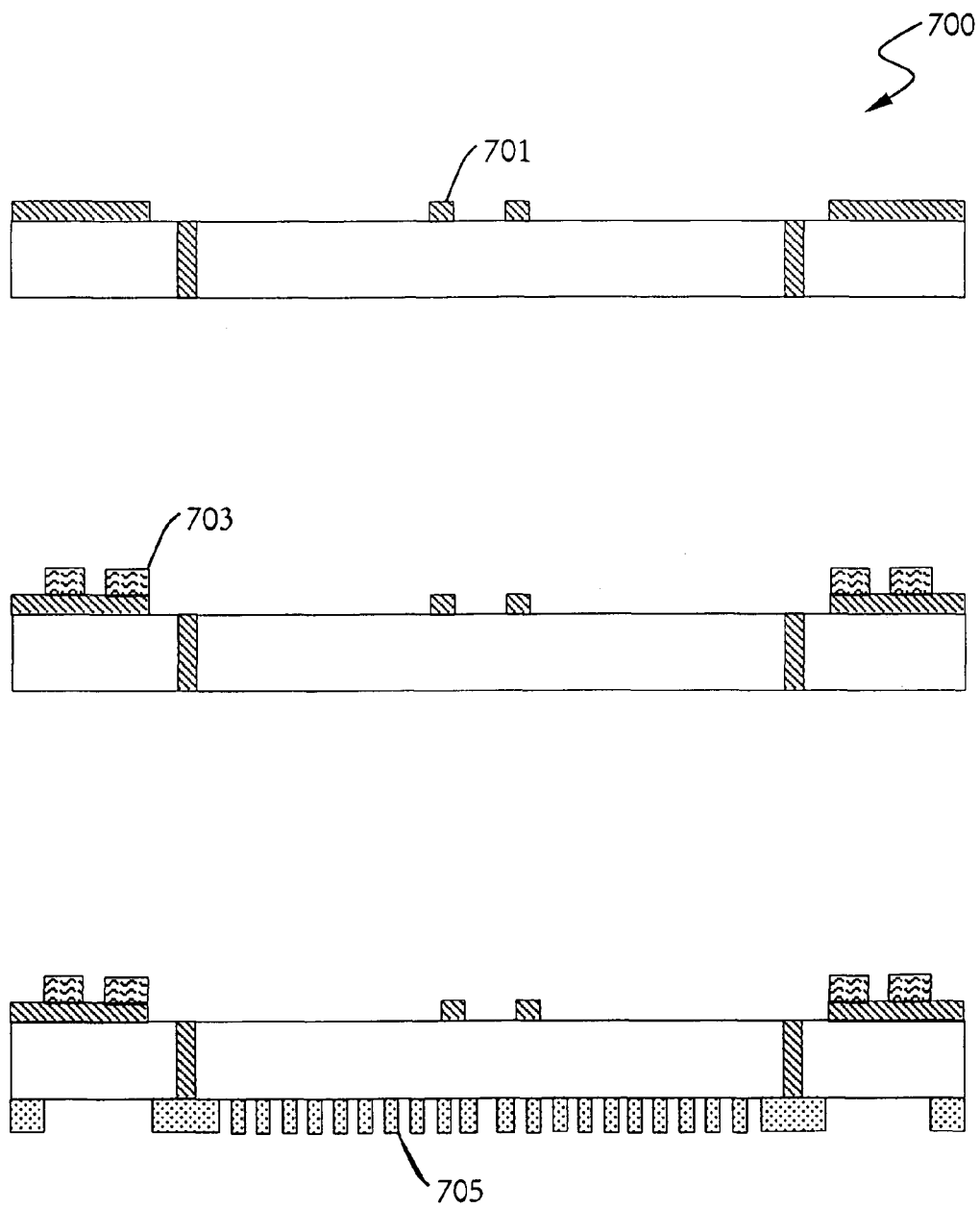

The polyimide is patterned to define gimbal structure 701, referring to the next illustration in FIG. 7. Patterning often occurs using lithography and etching processes, but can be others. The polyimide is selectively patterned for subsequent isolation of overlying conductive layers, which will be further described. The method forms a conductive copper layer 703 overlying the polyimide layer to form an electrode layer. A seed layer (e.g., Cr and Cu) is often deposited first using sputtering followed by an electroplating process of copper to reach a predetermined and/or designed thickness. In this particular embodiment, the thickness of the copper layer ranges from about 10 micrometers or less, depending upon the embodiment. Other conductive layers or elements can also be formed depending upon the embodiment.

Figure 8:
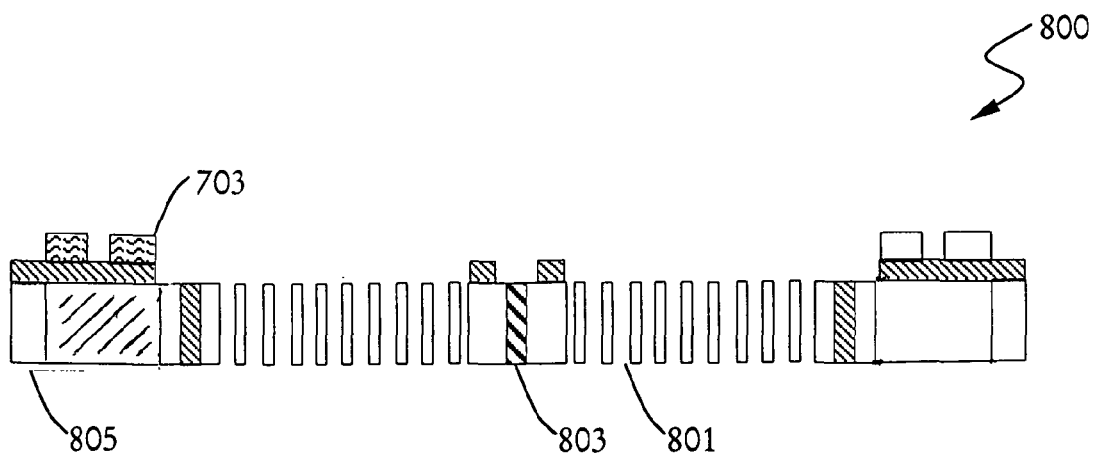

The method then patterns the lower surface of the substrate to define comb drive structures according to preferred embodiments. A photolithography process patterns the photoresist to define the comb drive structure 705. Referring to FIG. 8, a subsequent stainless steel etch forms the comb structure 801, the mechanical spring 803, and the gimbal structure 805. As shown, patterning occurs through the thickness of the substrate in certain regions. Additionally, certain portions of the copper traces are freed (not shown) by a polyimide etch and other portions remain overlying the polyimide layer. Here, the copper trace 703 in FIG. 8 corresponds to reference numeral 513 in FIG. 5 according to a certain embodiment.

It may assist the reader to understand the operation of the comb drives before describing the fabrication process in more detail. Here, the drive voltage for the comb drives is inversely proportional to a gap 905 between the comb fingers. To lower the drive voltage to be less than 20 volts, the gap should be few micrometers or less, which cannot generally be achieved using conventional technologies. Additionally, each of the comb fingers should have a surface region, which faces a corresponding comb finger. The surface regions between the respectively comb fingers should have a substantially constant gap along the surface of such regions. That is, each of the surfaces should be substantially parallel to each other. In order to achieve such characteristics, the method includes various process steps.

Figure 9:
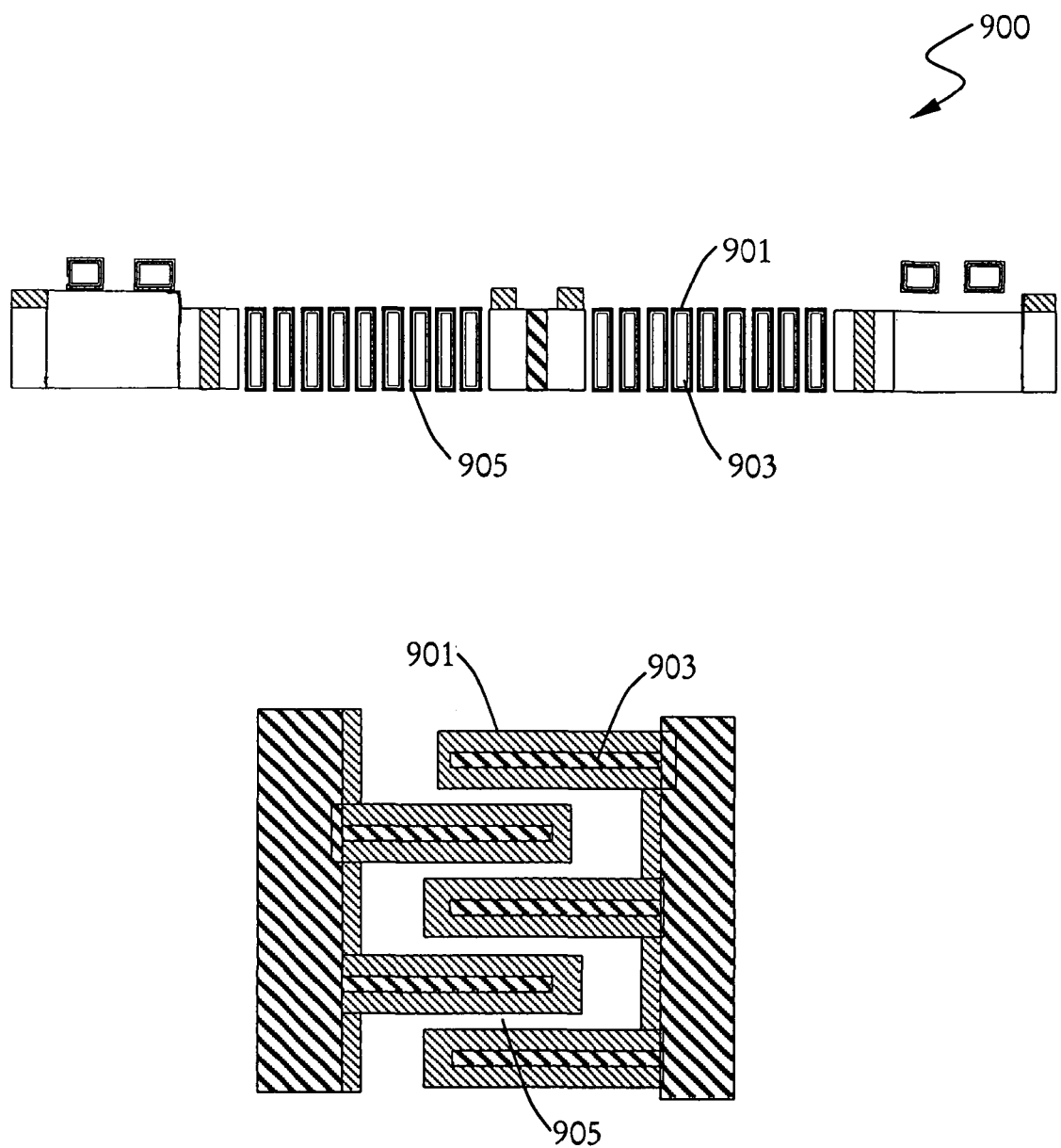

Referring to FIG. 9, the method provides a post-etch electroplating process of the comb finger structure 903. The electroplating process forms a coating overlying the etched comb fingers. Such coating covers any non-uniformities and provides a smooth finish of a desirable thickness to achieve a desirable gap spacing. In a specific embodiment, a seed layer is nickel bearing material is formed overlying exposed etched surfaces of the comb fingers. The seed layer attaches firmly to the comb fibers. The method then forms a highly conductive layer using, for example, gold to desired thickness 901. Preferably, the gold is electroplated, where the thickness of the gold material is controlled to a predetermined thickness to achieve the desired gap spacing between the comb fingers. As noted, the gap spacing is desirably about 10 microns and less, depending upon the embodiment. Of course, depending upon the applications, other materials may be used. Additionally, there may be other methods to form the conductive material overlying the comb fingers. Depending upon the embodiment, it is not necessary to use a conductive material. Such material may be insulating or semiconductor depending upon the embodiment.

Figure 10:
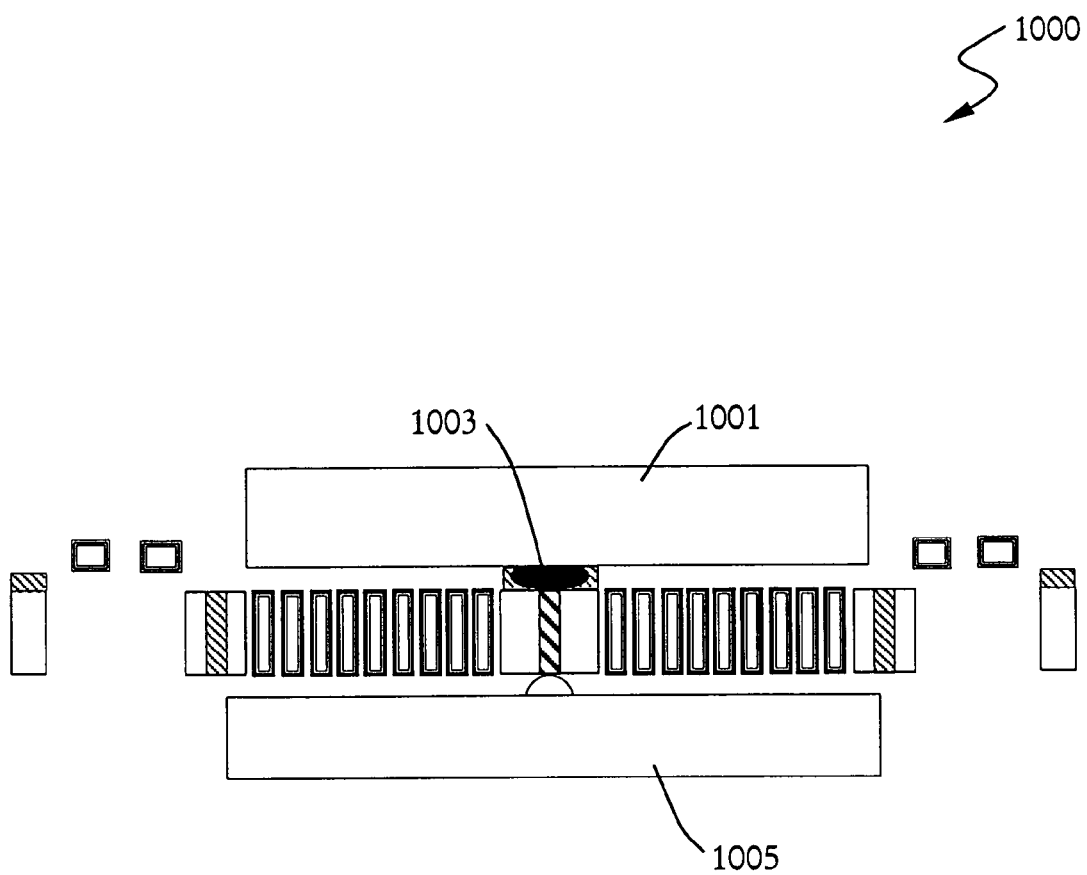
FIG. 10 is a detailed side-view diagram of a head gimbal assembly with integrated comb drive actuator formed on the gimbal substrate.

FIG. 10 is a detailed side-view diagram of a head gimbal assembly with integrated comb drive actuator formed on the gimbal substrate 1000 according to an embodiment of the present invention. This diagram is merely an example, which should not unduly limit the scope of the claims herein. One of ordinary skill in the art would recognize many other variations, modifications, and alternatives. Like reference numerals are used in this figure as others, but are not intended to be limiting. As shown, the head/slider 1001 is attached to the center portion of the comb drive actuator by adhesive materials such as UV-cure epoxy or other suitable materials. The head gimbal assembly is integrated to the loadbeam 1005 to form a complete suspension for a Hard Disk Drive.

Figure 11:
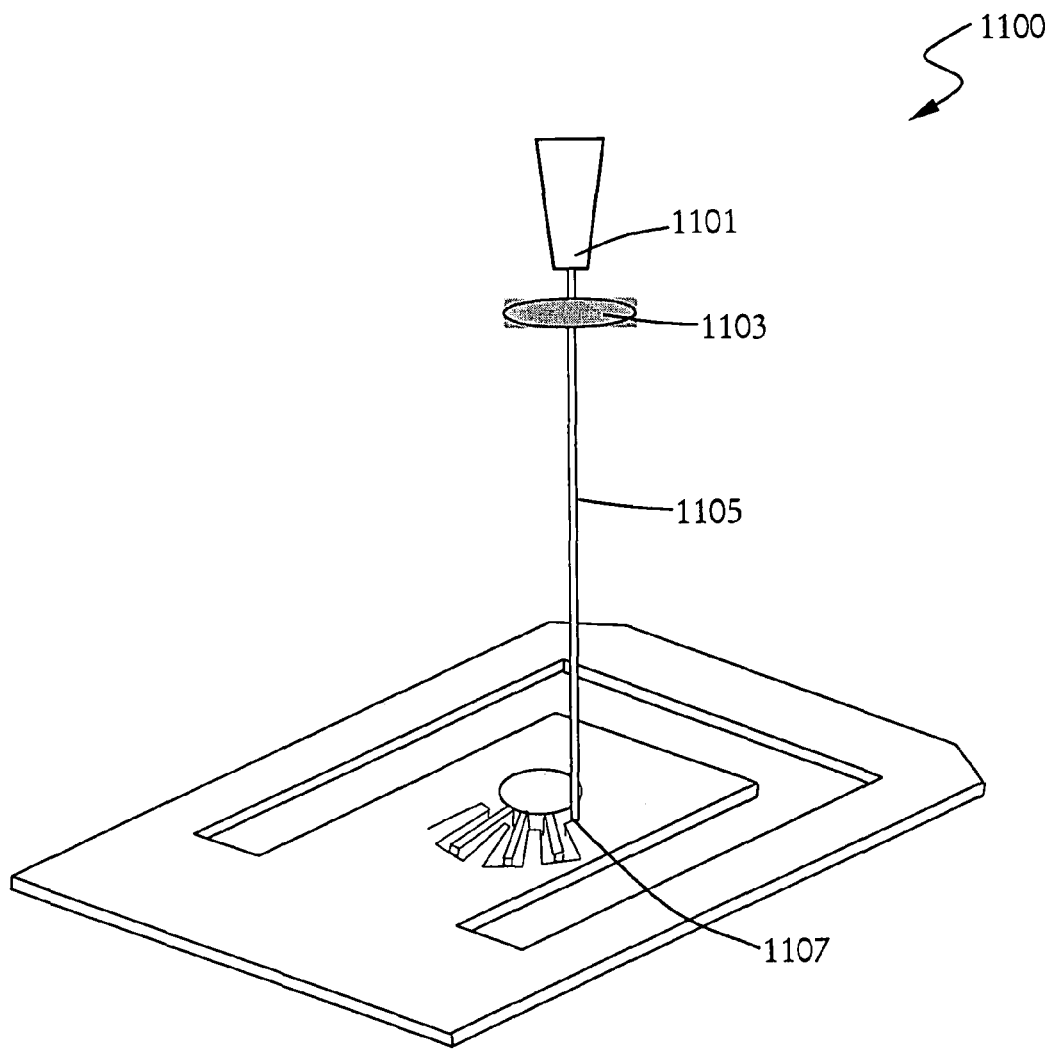
FIG. 11 is a detailed diagram of fabricating an integrated comb drive actuator on the gimbal substrate using laser micromachining.

FIG. 11 is a detailed diagram of fabricating an integrated comb drive actuator on the gimbal substrate using laser micromachining 1100 according to an embodiment of the present invention. This diagram is merely an example, which should not unduly limit the scope of the claims herein. One of ordinary skill in the art would recognize many other variations, modifications, and alternatives. Like reference numerals are used in this figure as others, but are not intended to be limiting. As shown, a laser generator device 1101 emits a laser beam 1005 that is focus by a lens system 1003. The laser beam forms the comb drive structure by ablation of the stainless steel in a predefined pattern 1107. Depending upon the embodiment, there may be other ways of forming the comb structures according to certain aspects of the present invention.

One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for operating a disk drive apparatus, the method comprising:

applying a read/write head onto a movable disk, the movable disk being rotated about a fixed axis, the read/write head being disposed on a movable drive device on a tongue portion, the movable drive device being operatively coupled to a fixed drive device, the tongue portion being a single continuous piece of material that i the fixed device; and adjusting a voltage source coupled between the fixed drive device and the movable drive device to cause movement of the read/write head by forming an interaction between the fixed drive device and the movable drive device.

2. The method of claim 1 wherein the interaction is an electrostatic actuation force.

3. The method of claim 2 wherein the electrostatic actuation force causes movement of the movable drive device.

4. The method of claim 1 wherein the movable drive device comprises a first comb drive coupled to a second comb drive of the fixed drive device to cause the movement of the read/write head in an annular manner about a fixed axis, the fixed axis being within a center region of the movable drive device.

5. The method of claim 1 wherein the movable drive device is coupled to the fixed drive device within the tongue portion through a plurality of hinge members.

6. The method of claim 1 wherein the movement is a linear movement of the read/write head.

7. The method of claim 1 wherein the tongue portion is stainless steel.

8. The method of claim 1 wherein the movement has a spatial distance of less than one micron.

9. The method of claim 1 wherein the interaction is an electrostatic force caused between the fixed drive device and the movable drive device using a voltage source.

* * * * *

UNITED STATES PATENT AND TRADEMARK OFFICE
CERTIFICATE OF CORRECTION

PATENT NO. : 7,149,060 B2 Page 1 of 1
APPLICATION NO. : 10/440452
DATED : December 12, 2006
INVENTOR(S) : Xiao Yang, Visit Thaveeprungsriporn and Szu-Han Hu It is certified that error appears in the above-identified patent and that said Letters Patent is hereby corrected as shown below:

Column 8, line 67, after "that" delete "i" and replace with --includes the movable drive device and--

Signed and Sealed this

Twenty-fourth Day of June, 2008

JON W. DUDAS
*Director of the United States Patent and Trademark Office*